US009823545B2

(12) United States Patent
Kanai (10) Patent No.: US 9,823,545 B2
(45) Date of Patent: Nov. 21, 2017

(54) EYEPIECE OPTICAL SYSTEM (71) Applicant: RICOH IMAGING COMPANY, LTD., Tokyo (JP)

(72) Inventor: Moriyasu Kanai, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 5 days.

(21) Appl. No.: 15/000,365

(22) Filed: Jan. 19, 2016

(65) Prior Publication Data

US 2016/0209726 A1 Jul. 21, 2016

(30) Foreign Application Priority Data

Jan. 21, 2015 (JP) ................. 2015-009026

(51) Int. Cl.
  *G03B 13/08* (2006.01)
  *G02B 17/08* (2006.01)
  *G02B 5/02* (2006.01)

(52) U.S. Cl.
  CPC .......... *G03B 13/08* (2013.01); *G02B 5/0278* (2013.01); *G02B 17/08* (2013.01)

(58) Field of Classification Search
  CPC ....... G03B 13/00–13/36; G02B 5/0278; G02B 17/08
  USPC ......................... 359/643–647, 599
  See application file for complete search history.

(56) References Cited

U.S. PATENT DOCUMENTS

| 2008/0088729 | A1* | 4/2008 | Ochi | H04N 5/2251 348/333.01 |
| 2014/0307326 | A1* | 10/2014 | Tanaka | G02B 1/115 359/645 |
| 2015/0116823 | A1* | 4/2015 | Kanai | G02B 23/145 359/432 |

FOREIGN PATENT DOCUMENTS

| JP | 2010-237430 | 10/2010 |
| JP | 2012-242740 | 12/2012 |

* cited by examiner

*Primary Examiner* — Jordan Schwartz
*Assistant Examiner* — George G King
(74) *Attorney, Agent, or Firm* — Greenblum & Bernstein, P.L.C.

(57) ABSTRACT

An eyepiece optical system includes a focal-plane plate, having a positive refractive power on one side and a diffusion surface on the other side thereof; a reflector which reflects light rays of an object image, formed on the diffusion surface, a predetermined number of times; an optical lens group, by which the object image is observed, in that order along an optical path from the object side to the viewing side; and a condenser lens element, having a positive refractive power, provided between the focal-plane plate and the reflector, the condenser lens element having an aspherical surface formed on at least one side thereof. At least one of the aspherical surface of the condenser lens element has a profile, when viewed macroscopically, such that the positive refractive power thereof increasingly weakens with respect to a direction away from the optical axis.

6 Claims, 7 Drawing Sheets

EYEPIECE OPTICAL SYSTEM

BACKGROUND OF THE INVENTION

1. Field of the Invention

The present invention relates to an eyepiece optical system (finder optical system) provided in a photographing apparatus, such as an SLR (single-lens reflex) camera.

2. Description of Related Art

In an eyepiece optical system of an SLR camera, an object image formed via a photographing lens is formed onto a focal-plane plate (focusing plate). Thereafter, upon the object image that is formed on the focal-plane plate being inverted to produce an erected image via an image inverter, such as a pentagonal prism (hereinafter referred to as a "pentaprism"), etc., the erected image is magnified and displayed via an eyepiece optical lens system (loupe optical system), so that a user can observe the (magnified and erected) object image.

The above-described eyepiece lens system is required to have an adjustable diopter to suit the user's eyesight, is required to ensure a sufficiently long eye relief (the distance between the eyepoint and the apex of the outermost surface on the eyepoint side of the eyepiece optical system), is required to have a high observation magnification, and is required to have a favorable optical quality having a minimal amount of distortion so that the object image (formed through the photographing lens) can be viewed with substantially no distortion.

Patent Literature 1 (Japanese Unexamined Patent Publication No. 2010-237430) discloses an eyepiece optical system which is provided with a negative distortion-correction lens element (field lens), between a focal-plane plate (focusing plate) and an image-erecting prism (pentaprism), for correcting distortion that occurs in a negative lens group positioned closest to the viewing side (eye side) within a loupe optical system.

Patent Literature 2 (Japanese Unexamined Patent Publication No. 2012-242740) discloses an eyepiece optical system which is provided with a positive condenser lens element positioned between a surface (focusing plate) on which an object image is formed, via a photographing lens, and an image-inverter member (prism), for producing an erected image, in order to achieve a high observation magnification.

In Patent Literature 1, since the paraxial refractive power of the distortion-correction lens element is negative, the focal length of the entire eyepiece optical system is longer than the focal length of the loupe optical system, which is provided on the viewing side with respect to the erecting prism (pentaprism/image-inverter). Therefore, there is a problem with the observation magnification being lower than when there is no distortion-correction lens element provided in the eyepiece optical system. Furthermore, although distortion in the eyepiece optical system is maintained at a reduced level by utilizing an aspherical surface on the distortion-correction lens element, the diverging function at the peripheral area of distortion-correction lens element becomes too strong due to the paraxial refractive power of this aspherical surface being negative and having an increasingly stronger negative refractive power with respect to a direction away from the optical axis. Accordingly, since the peripheral portion of a Fresnel lens (functioning as a condenser lens) provided at the incident surface of the focal-plane plate (typically a focusing surface on which the exiting surface forms an object image) is required to have a stronger converging function, an extremely strong positive refractive power is required at this peripheral portion. As a result, the Fresnel zone inclination angle at the peripheral part of the Fresnel lens becomes too large, thereby making manufacturing thereof difficult.

In Patent Literature 2, by providing a condenser lens element having a positive paraxial refractive power in front of an image-inverter member (prism), the focal length of the entire eyepiece optical system becomes shorter than the focal length of a loupe optical system, which is provided on the viewing side (eye side) of the image-inverter member (prism), thereby increasing the observation magnification of the eyepiece optical system compared to when such a condenser lens element is not provided. However, distortion that occurs in the loupe optical system is not corrected.

SUMMARY OF THE INVENTION

In view of the above-discussed problems, the present invention provides an eyepiece optical system which achieves a high observation magnification while favorably corrects distortion, thereby achieving a superior optical quality.

According to an aspect of the present invention, an eyepiece optical system (finder optical system) is provided, including a focal-plane plate, having a positive refractive power on one side and a diffusion surface on the other side thereof; a reflector which reflects light rays of an object image, formed on the diffusion surface, a predetermined number of times; an optical lens group, by which the object-emanating image is observed, in that order along an optical path from the object side to the viewing side; and a condenser lens element, having a positive refractive power, provided between the focal-plane plate and the reflector, the condenser lens element having an aspherical surface formed on at least one side thereof. At least one of the aspherical surface of the condenser lens element has a profile, when viewed macroscopically, such that the positive refractive power thereof increasingly weakens with respect to a direction away from the optical axis.

In the present specification, the phrase "the aspherical surface of the condenser lens element has a profile, when viewed macroscopically, such that the positive refractive power thereof increasingly weakens in a direction away from the optical axis" also includes the case in which even if, for example, a localized microscopic view of a portion of the profile of the aspherical surface of the condenser lens element has positive refractive power that does not increasingly weaken in a direction away from the optical axis (i.e., a portion in which the positive refractive power increases minutely or not at all), such a case is still included within the technical scope of the present invention (and would not be excluded from the technical scope of the present invention).

It is desirable for the diopter of the optical lens group to be adjustable with respect to the focal-plane plate, through the eyepiece optical system, and for the following condition (1) to be satisfied:

$$-0.030 < d*(n-1)*\tan\theta_1/h_1 + (t/n+d)*(1-n)*\tan\theta_2/h_1 < -0.005 \quad (1),$$

wherein $h_1$, which is calculated as $h_1 = f*\tan(14°)$, designates the height from the optical axis at the focal-plane plate, wherein f designates the focal length of the eyepiece optical system, in a state where the diopter with respect to the focal-plane plate, through the eyepiece optical system, is adjusted to −1; d designates the air-equivalent distance from the diffusion surface of the focal-plane plate to the incident surface of the condenser lens element; t designates the thickness of the condenser lens element at the optical axis; n designates the refractive index at the d-line of the condenser lens element; tan $\theta_n$ (n=1, 2) designates an inclination of the aspherical departure obtained from the aspherical surface sag amount that is calculated at the height h1 from the optical axis; tan $\theta_1$=(aspherical surface sag amount at a height $1.01h_1$–aspherical surface sag amount at height $0.99h_1$)/$0.02h_1$, when $h_1$ is measured from the optical axis at an incident surface of the condenser lens element; tan $\theta_2$=(aspherical surface sag amount at a height $1.01h_1$– aspherical surface sag amount at height $0.99h_1$)/$0.02h_1$, when $h_1$ is measured from the optical axis at an exit surface of the condenser lens element; aspherical surface sag amount at height $0.99h_1$=total sag amount at height $0.99h_1$– paraxial spherical-surface sag at height $0.99h_1$; aspherical surface sag amount at height $1.01h_1$=total sag amount at height $1.01h_1$–paraxial spherical-surface sag at height $1.01h_1$; and the sag amount is the amount of displacement being a tangent line and an optical surface.

It is desirable for an aspherical surface to be formed on the one side, which has a positive refractive power, of the focal-plane plate, and for the diffusion surface to be formed on an exit surface of the focal-plane plate.

It is desirable for the following condition (2) to be satisfied:

$$-0.5<\tan\theta_0/(\tan\theta_1-\tan\theta_2)<3.0 \quad (2),$$

wherein tan $\theta_n$ (n=1, 2) designates an inclination of the aspherical departure obtained from the aspherical surface sag amount that is calculated at the height h1 from the optical axis; tan $\theta_0$=(aspherical surface sag amount at a height $1.01h_1$–aspherical surface sag amount at height $0.99h_1$)/$0.02h_1$, when $h_1$ is measured from the optical axis at the positive refractive powered surface of the focal-plane plate; tan $\theta_1$=(aspherical surface sag amount at a height $1.01h_1$–aspherical surface sag amount at height $0.99h_1$)/ $0.02h_1$, when $h_1$ is measured from the optical axis at an incident surface of the condenser lens element; tan $\theta_2$= (aspherical surface sag amount at a height $1.01h_1$–aspherical surface sag amount at height $0.99h_1$)/$0.02h_1$, when $h_1$ is measured from the optical axis at an exit surface of the condenser lens element; aspherical surface sag amount at height $0.99h_1$=total sag amount at height $0.99h_1$–paraxial spherical-surface sag at height $0.99h_1$; aspherical surface sag amount at height $1.01h_1$=total sag amount at height $1.01h_1$– paraxial spherical-surface sag at height $1.01h_1$; and the sag amount is the amount of displacement being a tangent line and an optical surface.

It is desirable for the diopter of the optical lens group to be adjustable with respect to the focal-plane plate, through the eyepiece optical system, and for the following condition (3) to be satisfied:

$$-0.1<\tan\phi_1-\tan\phi_2 \quad (3),$$

wherein tan $\phi_1$ designates the inclination, relative to the optical axis, of a tangent line at a height $h_2$ from the optical axis on the incident surface of the condenser lens element, on a predetermined sectional plane through said optical axis; tan $\phi_2$ designates the inclination, relative to the optical axis, of a tangent line at a height $h_2$ from the optical axis on the exit surface of the condenser lens element, on said predetermined sectional plane; and $h_2$, which is calculated as $h_2$=f*tan(16°), designates the height from the optical axis, wherein f designates the combined focal length of the eyepiece optical system, in a state where the diopter with respect to the focal-plane plate, through the eyepiece optical system, is adjusted to $-1$.

It is desirable for the diopter of the optical lens group to be adjustable with respect to the focal-plane plate, through the eyepiece optical system, and for the following condition (4) to be satisfied:

$$0.01<t/f<0.2 \quad (4),$$

wherein f designates the combined focal length of the eyepiece optical system, in a state where the diopter with respect to the focal-plane plate, through the eyepiece system, is adjusted to a diopter of $-1$, and t designates the thickness of the condenser lens element at the optical axis.

It is desirable for the eyepiece optical lens group to include a negative first lens element, a positive biconvex second lens element, and a third lens element having a concave surface on the viewing side, in that order along the optical path from the object side toward the viewing side. The second lens element is provided for movement in a direction along the optical axis of the eyepiece optical lens group to change a diopter adjustment, with respect to the focal-plane plate. The following conditions (5) and (6) are satisfied:

$$-0.2<f/f3<0.2 \quad (5),$$

and $$1.15<[L3b/(L3n-1)+L3d/L3n]/\{L3b/(L3n-1)\}<1.30 \quad (6),$$

wherein f designates the combined focal length of the eyepiece optical system, in a state where the diopter with respect to the focal-plane plate, through the eyepiece optical system, is adjusted to a diopter of $-1$; f3 designates the focal length of the third lens element; L3n designates the refractive index of the third lens element at the d-line; L3b designates the radius of curvature of the surface on the viewing side of the third lens element; and L3d designates the lens thickness of the third lens element.

It is desirable for an effective diagonal length of the one side, which has a positive refractive power, of the focal-plane plate to be set at a half-size of at least 10 mm.

According to the present invention, an eyepiece optical system is obtained which achieves a high observation magnification and favorably corrects distortion while achieving a superior optical quality.

The present disclosure relates to subject matter contained in Japanese Patent Application No. 2015-009026 (filed on Jan. 21, 2015) which is expressly incorporated herein in its entirety.

BRIEF DESCRIPTION OF THE DRAWINGS

The present invention will be discussed below in detail with reference to the accompanying drawings, in which.

DESCRIPTION OF EMBODIMENTS

Figure 1:
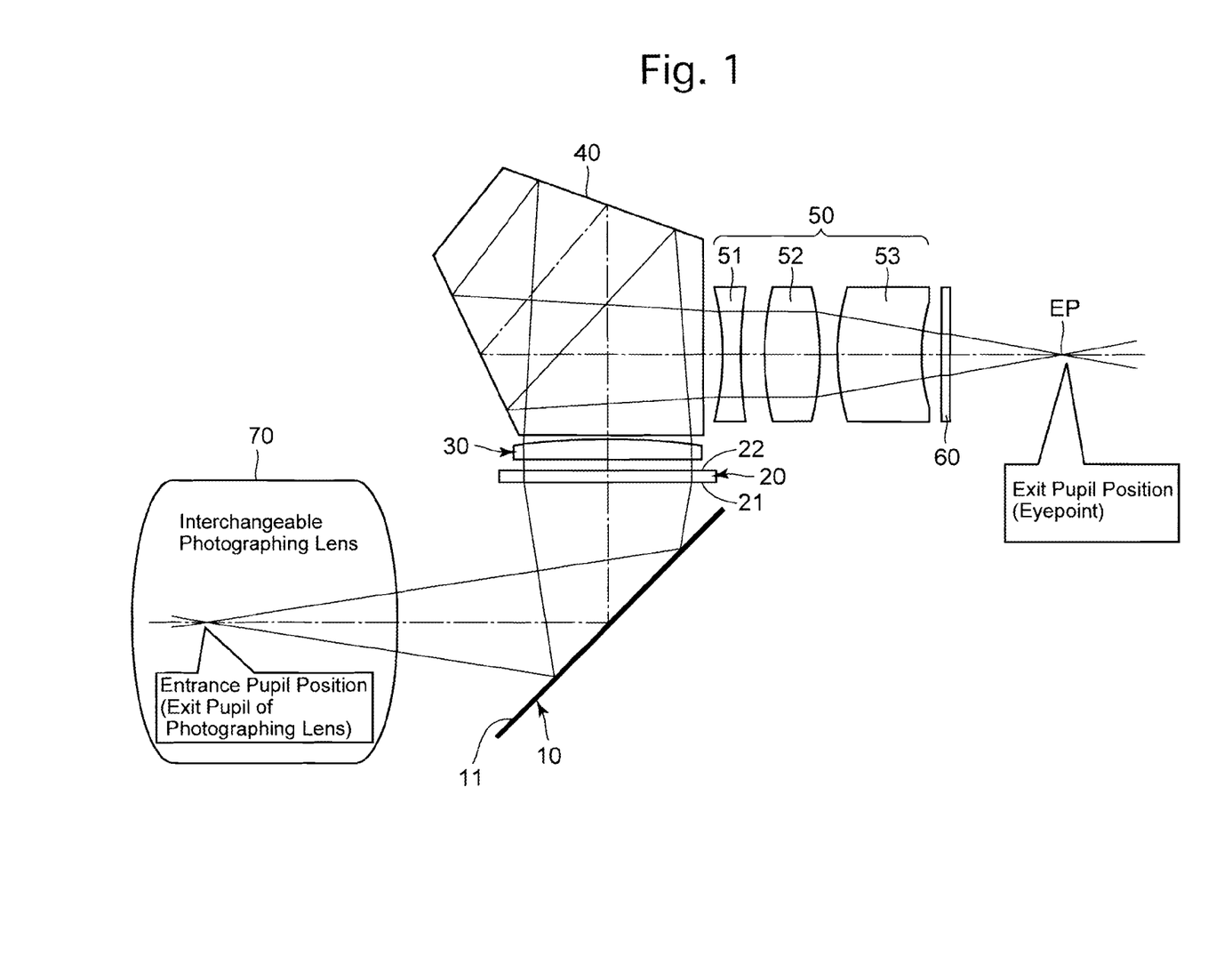
FIG. 1 is a schematic configuration diagram of an SLR camera provided with an eyepiece optical system, according to the present invention.

FIG. 1 is a schematic configuration diagram of an SLR (single-lens reflex) camera provided with an eyepiece optical system, according to the present invention.

The SLR camera which is provided with the eyepiece optical system (finder optical system), according to the present invention, includes a mirror 10, a focal-plane plate (focusing plate) 20, a condenser lens element (field lens) 30, a pentaprism (reflector/image inverter) 40, an eyepiece optical lens group (loupe optical system) 50, and a cover glass 60, in that order from the object side to the viewing side (eye side).

The mirror 10 is provided, on a surface thereof, with a reflection surface 11, which constitutes a half-mirror surface which reflects part of the incident light from the entrance pupil position of an interchangeable photographing lens 70 (exit pupil of the photographing lens 70) while allowing the remaining incident light to transmit therethrough. The mirror 10 is rotatable between a mirror-down position, in which the mirror 10 is inserted into the photographing optical path to reflect object-emanating light toward the focal-plane plate 20, and a mirror-up position, in which the mirror 10 retreats from the photographing optical path to allow the object-emanating light to pass through to an image sensor (not shown), via a rotational drive mechanism (not shown). A sub-mirror (not shown) is provided on the underside of the mirror 10. At the mirror-down position of the mirror 10, the sub-mirror reflects and guides the part of the object-emanated light that has transmitted through the mirror 10 to a focal detection sensor (not shown); and at the mirror-up position of the mirror 10, the sub-mirror is stored in the underside of the mirror 10, thereby being removed from the photographing optical path. FIG. 1 depicts the mirror-down position; the mirror-up position has been omitted from FIG. 1.

The object image formed through the photographing lens 70 is formed onto the focal-plane plate 20 (after being reflected by the reflection surface 11 of the mirror 10), to thereby define a finder field of view. A Fresnel surface (Fresnel lens portion) 21, having a positive paraxial refractive power, which is an aspherical surface that has been formed into a Fresnel surface, is formed on the incident surface (the surface on the object side/one side) of the focal-plane plate 20. An imaging surface 22, onto which the object image is projected for monitoring the imaging state of the object image that is formed via the photographing lens 70 and the reflection surface 11 of the mirror 10, is provided on an exit surface (the surface on the viewing side/the other side) of the focal-plane plate 20, and is formed as a diffusion surface. The effective diagonal length of the focal-plane plate 20 (the Fresnel surface 21) is set at a half-size of at least 10 mm (a full-size of at least 20 mm).

The condenser lens element 30 is a condenser lens element, having a positive paraxial refractive power, onto which an aspherical surface is formed on at least one surface thereof (one surface on the object side, one surface on the viewing side, or both surfaces on the object and image sides). The aspherical surface of the condenser lens element 30 has a profile (aspherical-surface profile) which has an increasingly weaker positive refractive power with respect to a direction away from the optical axis. In other words, the aspherical surface of the condenser lens element 30 has a profile, when viewed macroscopically, such that the positive refractive power thereof increasingly weakens with respect to a direction away from the optical axis. Accordingly, even if, for example, a localized microscopic view of a portion of the profile of the aspherical surface of the condenser lens element has positive refractive power that does not increasingly weaken with respect to a direction away from the optical axis (i.e., a portion in which the positive refractive power increases minutely or not at all), the profile of the condenser lens element 30 is still referred to as a profile having an increasingly weaker positive refractive power with respect to a direction from the optical axis, when viewed macroscopically.

The pentaprism 40 inverts the object image that is formed, through the photographing lens 70, on the imaging surface 22 of the focal-plane plate 20 to produce an erected image. Instead of the pentaprism 40, various optical members having an image-inverting function, such as a hollow prism, etc., can be used as a reflector or image inverter.

The eyepiece optical lens group 50 is provided for magnifying and viewing the erected image that has been erected by the pentaprism 40. The eyepiece optical lens group 50 is provided with a negative first lens element 51, a positive second lens element 52, and a weak positive third lens element 53, in that order along the optical path from the object side toward the viewing side. Each of the first lens element 51, the second lens element 52 and the third lens element 53 is provided with an aspherical surface on at least one side. The second lens element 52 constitutes a diopter adjustment lens element which moves in the optical axis direction when a diopter adjustment is carried out.

The cover glass 60 is provided between the eyepiece optical lens group 50 (the third lens element 53) and the eyepoint EP (the exit-pupil position); the cover glass 60 also acts as an optical filter.

Since the eyepiece optical system is designed so that the exit pupil (eyepoint EP) is positioned outside and behind the eyepiece optical lens group, it is typical for positive distortion (so that the observed image appears as pincushion distortion) to easily increase. In an eyepiece optical lens group having a small exit pupil light-bundle diameter, such as in a pair of binoculars or a microscope, although there are examples of such an eyepiece optical lens group which corrects distortion by employing at least one aspherical lens surface in an eyepiece optical lens group of an eyepiece optical system for viewing an image that is projected onto a diffusion surface of a focal-plane plate, the exit pupil light-bundle diameter is large, so that coma increases, thereby causing difficulties in correcting distortion.

In the eyepiece optical system of the illustrated embodiments, in order to suppress an increase in coma and correct distortion, an aspherical lens element (condenser lens element 30) is employed at a position where the light bundle is narrow (in the case where the object point is assumed to be at (defined at) the focal-plane plate 20), i.e., at a position between the focal-plane plate 20 and the pentaprism (reflector/image inverter) 40. In other words, the optical path in FIG. 1 is "an optical path which shows the imaging of the pupil (in which the optical path, which has its object point at the exit pupil of the photographing lens, appears to converge at the eyepoint)"; whereas, the "light bundle is narrow" refers to a light bundle which has its object point at the focal-plane plate 20, and this light bundle passes through the eyepoint in an afocal manner (as substantially parallel light rays) (the "imaging of the pupil" can also be referred to as "imaging of an object"). Furthermore, since the "light bundle which has its object point at the focal-plane plate 20" refers to divergent light that diverges from the focal-plane plate 20, the closer the light bundle is to the focal-plane plate 20, the narrower the light bundle.

Furthermore, in the eyepiece optical system of the illustrated embodiments, in order to maintain or increase the observation magnification of the entire eyepiece optical system, i.e., in order to make the focal length of the entire eyepiece optical system shorter than the focal length of the eyepiece optical lens group 50, at least the paraxial refractive power of the aspherical lens element (condenser lens element 30) that is provided between the focal-plane plate 20 and the pentaprism 40 is made positive. Furthermore, in the eyepiece optical system of the illustrated embodiments, by forming the aspherical lens element (condenser lens element 30), which is provided between the focal-plane plate 20 and the pentaprism 40, to have an aspherical profile having an increasingly weaker positive refractive power with respect to a direction from the optical axis, the condensing power at the outer peripheral portion of the aspherical profile can be weakened. Accordingly, positive distortion occurring at the eyepiece optical lens group 50 can be corrected without increasing coma.

Condition (1) specifies the aspherical surface profile of the condenser lens element 30. In an eyepiece optical system of a photographing apparatus (35 mm format/APS-C format), to which a typical interchangeable photographing lens is attached, light rays which pass through the eyepoint at an exit angle of 14° from the eyepiece optical lens group 50 correspond to approximately two thirds (⅔) of the focal-plane plate 20 for a 35 mm format, with respect to the center of the field-of-view (passing through the eyepoint at an exit angle of 0°) or corresponds to the peripheral portion (closer to the outer periphery than approximately two thirds (⅔) of the focal-plane plate 20) of the focal-plane plate 20 for an APS-C format, with respect to the center of the field-of-view; this area on focal-plane plate 20 wherein the light rays pass through the eyepoint at an exit angle of 14° is where distortion, caused by distortion occurring in the eyepiece optical lens group 50, of the image on the focal-plane plate 20 is apparent.

The "exit angle" in the above explanation of condition (1) refers to an angle corresponding to the vertical axis "B" in the various aberrations diagrams (FIGS. 3B through 3D, FIGS. 5B through 5D, and FIGS. 7B through 7D) of the following first through third numerical embodiments, which are discussed later. The angle of the light rays that are incident on the user's eye from the outermost corner of the field-of-view (the corner with respect to the diagonal line) is referred to as the "(maximum) apparent visual angle". In the various aberration diagrams (FIGS. 3B through 3D, FIGS. 5B through 5D, and FIGS. 7B through 7D) of the first through third numerical embodiments, the apparent visual angles (B) are:

First numerical embodiment: "B=17.8°"
Second numerical embodiment: "B=17.9°"
Third numerical embodiment: "B=16.1°"

The apparent visual angle of the light rays travelling from the center of the field-of-view is naturally "B=0.0°". The "(maximum) apparent visual angle" is the angle of the light rays that are incident on the user's eye (i.e., the light rays exiting from the optical system) relative to the optical axis of the optical system in an optical path from the object to the user's eye via the optical system.

Furthermore, "an eyepiece optical system of a photographing apparatus, to which a typical interchangeable photographing lens is attached" refers to, for example, an image sensor size (e.g., for a 35 mm format, a half amount:18 mm×12 mm, wherein the diagonal size=$(18^2 \times 12^2)^{1/2}$=21.64 mm) that is currently widely used. Since the "exit angle B" of each of the first through third numerical embodiments is an angle of light rays from a diagonal corner (i.e., the outermost peripheral portion) of the focal-plane plate 20 (the size of which is the same as that of the image sensor), "the light rays at an exit angle of 14°" corresponds to light rays incident on the eye at "approximately 80%" of the focal-plane plate 20, wherein the center of the focal-plane plate 20 is "0%" and the outermost periphery (the diagonal size of 21.64 mm) of the focal-plane plate 20 is "100%", as can be understood from the following apparent visual angle calculations at an exit angle of 14°:

First numerical embodiment $\tan 14°/\tan 17.8° = 0.78 = 78\%$

Second numerical embodiment $\tan 14°/\tan 17.9° = 0.77 = 77\%$

Third numerical embodiment $\tan 14°/\tan 16.1° = 0.86 = 86\%$

Since almost no distortion occurs at the paraxial light bundle (in the vicinity of the center of the focal-plane plate 20), distortion does not need to be considered, and the issue of distortion at the outer peripheral portions (due to them being corners) of the focal-plane plate 20 is of low importance, the "exit angle of 14°" is used based on "the light rays of 'approximately 80%' of the focal-plane plate 20 incident on the eye" being the most appropriate assessment in this case. Furthermore, "approximately two thirds (⅔) of the peripheral portion with respect to the center of the field-of-view" refers to "approximately 80%" of the focal-plane plate 20.

By determining an optimal aspherical surface of the condenser lens element 30 that satisfies condition (1), distortion can be favorably corrected. If the upper limit of condition (1) is exceeded, since the distortion is insufficiently corrected, pincushion distortion remains in the observed image.

If the lower limit of condition (1) is exceeded, since the distortion becomes overcorrected, barrel distortion remains in the observed image.

The "n" in "tan $\theta_n$ (n=1, 2)" in condition (1) is used for identifying the surfaces of the eyepiece optical system, wherein "n=1" corresponds to the incident surface (surface no. 3 in Tables 1, 4 and 7) of the condenser lens element 30, and wherein "n=2" corresponds to the exit surface (surface no. 4 in Tables 1, 4 and 7) of the condenser lens element 30.

In the eyepiece optical system of the illustrated embodiments, a strong positive refractive power for solely relaying the exit pupil of the photographing lens 70 to the eyepoint EP is not provided in the aspherical lens element (condenser lens element 30), which is provided between the focal-plane plate 20 and the pentaprism 40. Consequently, in the eyepiece optical system of the illustrated embodiments, a positive powered Fresnel lens surface (Fresnel lens portion) 21 is formed on the incident surface of the focal-plane plate 20, and the exit pupil of the photographing lens 70 is relayed to the eyepoint EP via the combined refractive power of the Fresnel lens surface (Fresnel lens portion) 21 and the aspherical lens element (condenser lens element 30).

Furthermore, in the illustrated embodiments, by optimizing the balance between the aspherical surface deviation of the Fresnel lens surface (Fresnel lens portion) 21 of the focal-plane plate 20 and the aspherical surface deviation of the aspherical lens element (condenser lens element 30), distortion is favorably corrected, and the exit pupil of the photographing lens 70 is relayed to the eyepoint EP while reducing aberrations of the pupil and suppressing light-quantity irregularities.

Condition (2) is for maintaining a reduced amount of pupil aberration with the Fresnel lens surface (Fresnel lens portion) 21 of the focal-plane plate 20 and the aspherical lens element (condenser lens element 30) constituting a combined optical system.

If either the upper limit or the lower limit of condition (2) is exceeded, pupil aberration increases, so that the exit pupil of the photographing lens 70 cannot be relayed to the eyepoint EP, and irregularities in brightness occur, such as the peripheral portion of the observed image becoming dark.

The "n" in "tan $\theta_n$ (n=0, 1, 2)" in condition (2) is used for identifying the surfaces of the eyepiece optical system, wherein "n=0" corresponds to the Fresnel surface formed on the incident surface (surface No. 1 in Tables 1, 4 and 7) of the focal-plane plate 20, "n=1" corresponds to the incident surface (surface no. 3 in Tables 1, 4 and 7) of the condenser lens element 30, and "n=2" corresponds to the exit surface (surface no. 4 in Tables 1, 4 and 7) of the condenser lens element 30.

The "tan $\theta_n$ (n=0, 1, 2)" in conditions (1) and (2) is calculated in accordance with the following procedure.

Using $h_1$, which is calculated as $h_1$=f*tan(14°), wherein f designates the combined focal length of the optical system (i.e., the entire eyepiece optical system) from the focal-plane plate 20 onwards, toward the viewing side, in a state where the diopter adjustment lens element (second lens element 52) is adjusted to a diopter of −1:

Aspherical-surface sag amount at a height $0.99h_1$=Total sag amount at height $0.99h_1$−Paraxial spherical-surface sag amount at height $0.99h_1$, Aspherical-surface sag amount at a height $1.01h_1$=Total sag amount at height $1.01h_1$−Paraxial spherical-surface sag amount at height $1.01h_1$, and tan $\theta_n$=(Aspherical-surface sag amount at a height $1.01h_1$−Aspherical-surface sag amount at a height $0.991h_1$)/$0.02h_1$, wherein in the case where an optical surface is formed as a Fresnel surface, each sag amount is calculated based on an imaginary continuous surface that is defined by such a Fresnel surface. Furthermore, in the case where the total sag amount of the rotationally symmetrical aspherical surface is defined as:

$$x=cy^2/(1+[1-\{1+K\}c^2y^2]^{1/2})+A4y^4+A6y^6+A8y^8+A10y^{10}+A12y^{12}.$$

the following calculations can be performed:

paraxial spherical sag amount=$cy^2/(1+[1-c^2y^2]^{1/2})$, and aspherical surface sag amount=total sag amount−paraxial spherical sag amount Condition (3) specifies the refractive power of light rays passing through a peripheral portion of the aspherical condenser lens element 30. The aspherical condenser lens element 30 has an aspherical-surface profile in which the positive refractive power at the peripheral portion thereof increasingly weakens; hence, it is necessary for the peripheral portion of the Fresnel lens surface 21 of the focal-plane plate 20 to maintain a strong light-ray converging function to compensate for the lack of refractive power at the peripheral portion of the aspherical condenser lens element 30. However, if the converging function of the peripheral light rays becomes too great, the Fresnel zone inclination angle at the peripheral part of the Fresnel lens becomes too large, thereby making manufacturing thereof difficult. Therefore, the refractive power of at the peripheral portion of the aspherical condenser lens element 30 changes from a converging function to a diverging function, and if the aspherical surface profile has an even stronger diverging function, the peripheral portion of the Fresnel lens surface 21 would require an even stronger converging function, thereby making it impossible to manufacture the peripheral portion of the Fresnel lens surface 21.

Condition (3) specifies a condition such that the refractive power at the peripheral portion of the aspherical condenser lens element 30 does not have a strong diverging function.

If the lower limit of condition (3) is exceeded, since the diverging function at the peripheral portion of the aspherical condenser lens element 30 becomes too strong, the light-ray converging function at the peripheral portion of the Fresnel lens surface 21 becomes too strong, deteriorating the manufacturability of the Fresnel lens surface 21.

The "tan $\phi_n$ (n=1, 2)" in condition (3) is calculated in accordance with the following procedure.

Using $h_2$, which is calculated as $h_2$=f*tan(16°), wherein f designates the combined focal length of the optical system (i.e., the entire eyepiece optical system) from the focal-plane plate 20 onwards, toward the viewing side, in a state where the diopter adjustment lens element (second lens element 52) is adjusted to a diopter of −1:

tan $\phi_1$ designates an inclination, relative to the optical axis, of a tangent line at a height h2 from the optical axis on the incident surface of the condenser lens element 30, on a predetermined sectional plane through the optical axis; and tan $\phi_2$ designates an inclination, relative to the optical axis, of a tangent line at a height h2 from the optical axis on the exit surface of the condenser lens element 30, on the predetermined sectional plane through the optical axis.

Condition (4) specifies the lens thickness of the aspherical condenser lens element 30. In the illustrated embodiments, the condenser lens element 30 has a relatively large aspherical-surface sag amount, specified by condition (1), in order to correct distortion. Whereas, as specified in condition (3), a strong dispersion function is not provided at the peripheral portion of the condenser lens element 30. In order to achieve both a large aspherical-surface sag amount and an weak dispersion function at the peripheral portion of the condenser lens element 30, the aspherical condenser lens element 30 is required to have a profile which becomes thinner at the peripheral portion (edge portion) thereof compared to the lens thickness at the center. In order to achieve a thinner peripheral portion (edge portion) of the condenser lens element 30, the condenser lens element 30 is provided with a defined center thickness that satisfies condition (4).

If the upper limit of condition (4) is exceeded, the lens thickness of the aspherical condenser lens element 30 becomes too large, so that since the distance between the focal-plane plate 20 and the pentaprism 40 must be enlarged, the focal length of the eyepiece optical lens group 50 increases, so that the observation magnification of the entire eyepiece optical system deteriorates.

If the lower limit of condition (4) is exceeded, the required thickness of the edge portion of the condenser lens element 30 cannot be attained, so that it becomes difficult to manufacture the condenser lens element 30.

In the illustrated embodiments, since distortion can be suppressed using the aspherical condenser lens element 30, the eyepiece optical lens group 50 can be configured of three simple lens elements. Conditions (5) and (6) specify the three-lens-element configuration of the eyepiece optical lens group 50.

As described above, the eyepiece optical lens group 50 is configured of a negative first lens element 51, a positive second lens element 52, and a weak-powered positive third lens element 53, in that order from the object side to the viewing side. By forming the first lens element 51 to have a negative refractive power, the positive refractive power of the second lens element 52 becomes larger than that of the refractive power of the eyepiece optical lens group 50, and by moving the second lens element 52 along the optical axis direction during a diopter adjustment, a small movement amount thereof is only required compared to the case where the entire eyepiece optical lens group 50 is moved. Furthermore, by designing the third lens element 53 so as to satisfy condition (5), the amount of movement of the second lens element 52 during a diopter adjustment can be reduced, and a favorable optical quality can be maintained.

Condition (5) specifies the refractive power of the third lens element 53.

If the upper limit of condition (5) is exceeded, the third lens element 53 possesses a positive refractive power that is too strong, so that due to the positive refractive power of the second lens element 52 being reduced, the movement amount of the second lens element 52 during a diopter adjustment increases.

If the lower limit of condition (5) is exceeded, the third lens element 53 possesses a negative refractive power that is too strong, so that since the positive refractive power of the second lens element 52 becomes large, aberrations (especially astigmatic difference) during a diopter adjustment fluctuate greatly at a diopter other than −1.

Condition (6) specifies the angular-magnification equivalent amount of the third lens element 53. As specified in condition (5), the third lens element 53 has a weak positive refractive power (or it is possible for the third lens element 53 to have a weak negative refractive power on the other side of zero) relative to the refractive power of the entire eyepiece optical lens group 50. Accordingly, the third lens element 53 has a strong afocal system properties. Furthermore, when the value of condition (5) is zero, the third lens element 53 becomes a complete afocal system. An afocal system changes the diopter of the incident light bundle so that the exit light bundle is the square (power of 2) of the angular magnification, and since the refractive power is zero, the lateral magnification has a property in which the lateral magnification does not change in accordance with a diopter adjustment. By utilizing this property of the lateral magnification of an afocal system, it becomes possible to enlarge the change in diopter only via the second lens element 52. By satisfying condition (6), the lens thickness of the third lens element 53 can be suppressed while miniaturizing the entire optical system, and a wide diopter adjustment range can be attained with a small movement amount of the second lens element (diopter adjustment lens element) 52.

If the angular magnification of the third lens element 53 increases to the extent of exceeding the upper limit of condition (6), the lens thickness of the third lens element 53 becomes large, thereby enlarging the entire optical system.

If the angular magnification of the third lens element 53 decreases to the extent of exceeding the lower limit of condition (6), the movement amount of the second lens element 52 increases during a diopter adjustment.

[Embodiments]

Specific numerical embodiments 1 through 3 will be herein discussed. In the aberration diagrams and the tables, the D-line, G-line and C-line show aberrations at their respective wave-lengths; S designates the sagittal image, M designates the meridional image, ER designates the pupil diameter, B designates the exit angle (°), f designates the focal length of the entire optical system (eyepiece lens system), R designates the radius of curvature, D designates the lens thickness or distance between lenses, N (d) designates the refractive index at the d-line, and v d designates the Abbe number with respect to the d-line. The unit used for the various lengths is defined in millimeters (mm). The values for the focal length f and the distance d between lens elements are shown in the order of the diopter of −1, −3 and +1.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}.$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, etc., and 'x' designates the total amount of sag.

[Numerical Embodiment 1]

Figure 2:
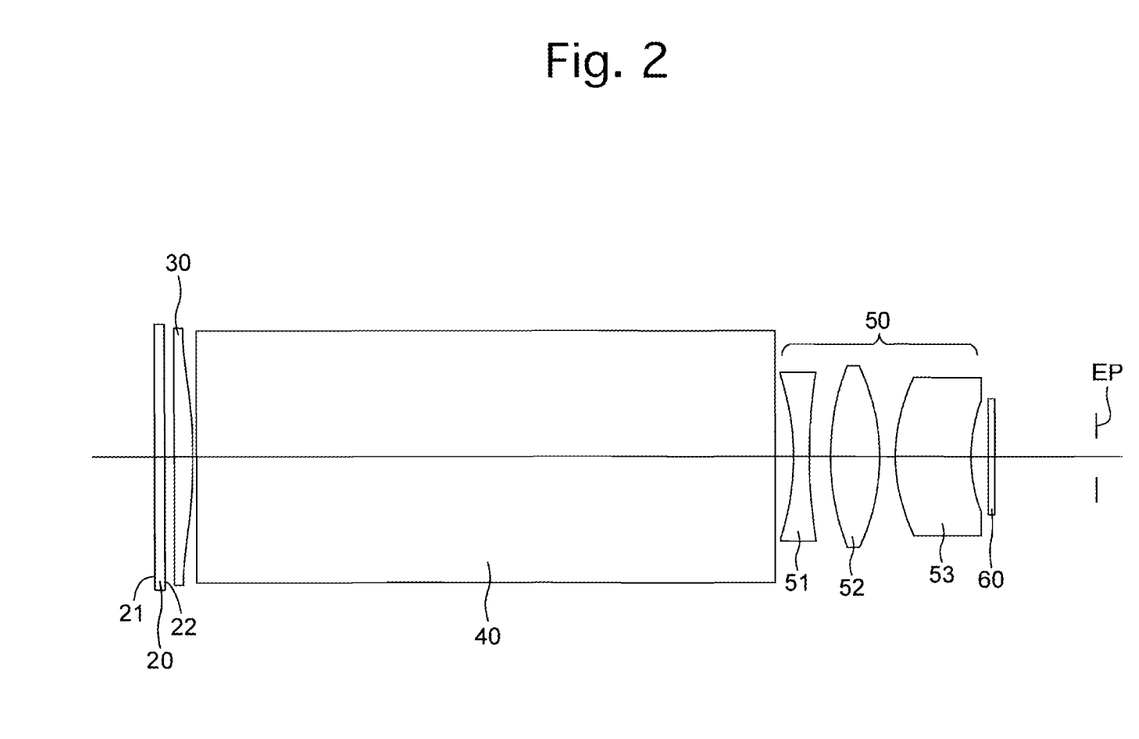
FIG. 2 shows a lens arrangement of a first numerical embodiment of an eyepiece optical system, according to the present invention, when the diopter with respect to the focal-plane plate (focusing plate) is adjusted to $-1$.
Figure 3A:
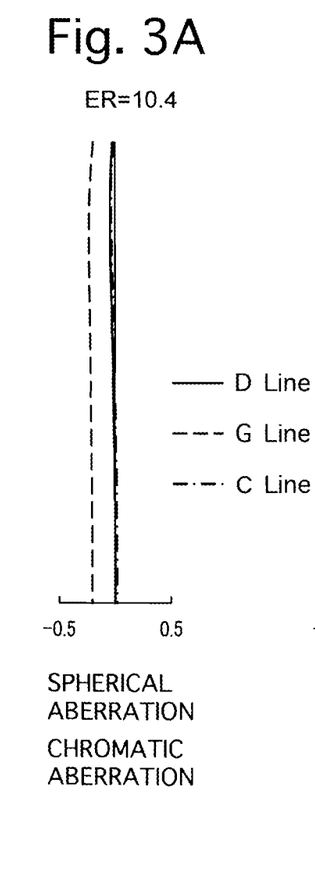
FIGS. 3A, 3B, 3C and 3D show various aberrations of the eyepiece optical system, having the lens arrangement of FIG. 2.
Figure 3B:
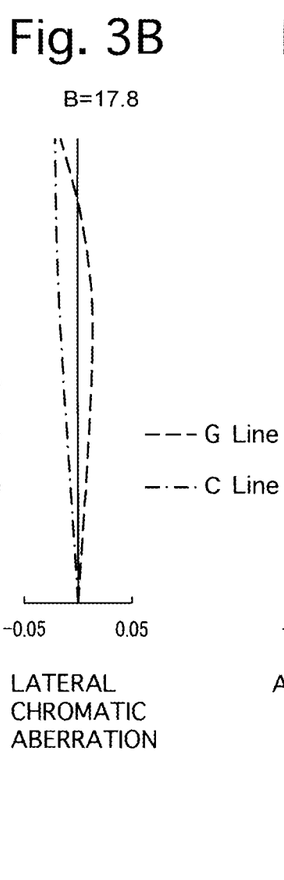
Figure 3C:
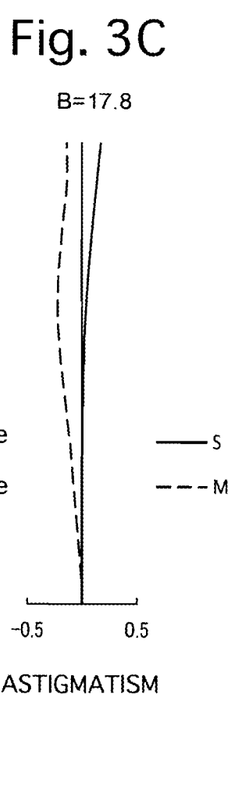
Figure 3D:
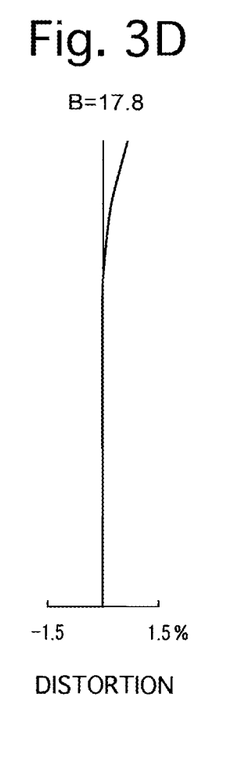

FIGS. 2 through 3D and Tables 1 through 3 show a first numerical embodiment of the eyepiece optical system, according to the present invention. FIG. 2 shows a lens arrangement of a eyepiece optical system when the diopter value is −1. FIGS. 3A, 3B, 3C and 3D show various aberrations of the eyepiece optical system when the diopter value is −1. Table 1 shows the lens surface data, Table 2 shows the aspherical surface data, and Table 3 shows various lens-system data.

The eyepiece optical system of the first numerical embodiment is configured of a focal-plane plate (focusing plate) 20, a condenser lens element (field lens) 30, a pentaprism (reflector/image inverter) 40, an eyepiece optical lens group (loupe optical system) 50, and a cover glass 60, in that order from the object side to the viewing side (eye side).

The focal-plane plate 20, onto which an object-emanating image is formed via the photographing lens 70 (FIG. 1), defines a finder field-of-view. A Fresnel surface (Fresnel lens portion) 21, having a positive refractive power, is formed on the incident surface (the surface on the object side) of the focal-plane plate 20. An imaging surface 22, constituting a diffusion surface, onto which an object-emanating image is formed via the photographing lens 70, is formed on an exit surface (the surface on the viewing side) of the focal-plane plate 20.

The condenser lens element 30 is configured of a plano-convex positive lens element having a convex surface on the viewing side, and an aspherical surface is formed on the convex surface (of the condenser lens element 30) that is on the viewing side. The aspherical surface on the viewing side of the condenser lens element 30 has a profile, when viewed macroscopically, such that the positive refractive power thereof increasingly weakens in a direction away from the optical axis.

The pentaprism 40 inverts the object image that is formed, through the photographing lens 70 (FIG. 1), on the imaging surface 22 of the focal-plane plate 20 to produce an erected image.

The eyepiece optical lens group 50 is provided for magnifying and viewing the erected image that has been erected by the pentaprism 40. The eyepiece optical lens group 50 is provided with a biconcave negative first lens element 51, a biconvex positive second lens element 52, and a positive meniscus third lens element 53 having a convex surface on the object side, in that order along the optical path from the object side toward the viewing side. An aspherical surface is formed on the object side of the first lens element 51, an aspherical surface is formed on the viewing side of the second lens element 52, and an aspherical surface is formed on the object side of the third lens element 53. The second lens element 52 constitutes a diopter adjustment lens element which moves in the optical axis direction when a diopter adjustment is carried out.

The cover glass 60 is provided between the eyepiece optical lens group 50 (the third lens element 53) and the eyepoint EP (the exit-pupil position); the cover glass 60 also acts as an optical filter.

TABLE 3

VARIOUS LENS-SYSTEM DATA

| Diopter | −1 Diopter | −3.0 Diopter | +1.0 Diopter |
|---|---|---|---|
| f | 66.796 | 69.081 | 64.6818 |
| D8 | 3.350 | 1.470 | 5.200 |
| D10 | 2.500 | 4.380 | 0.650 |

[Numerical Embodiment 2]

Figure 4:
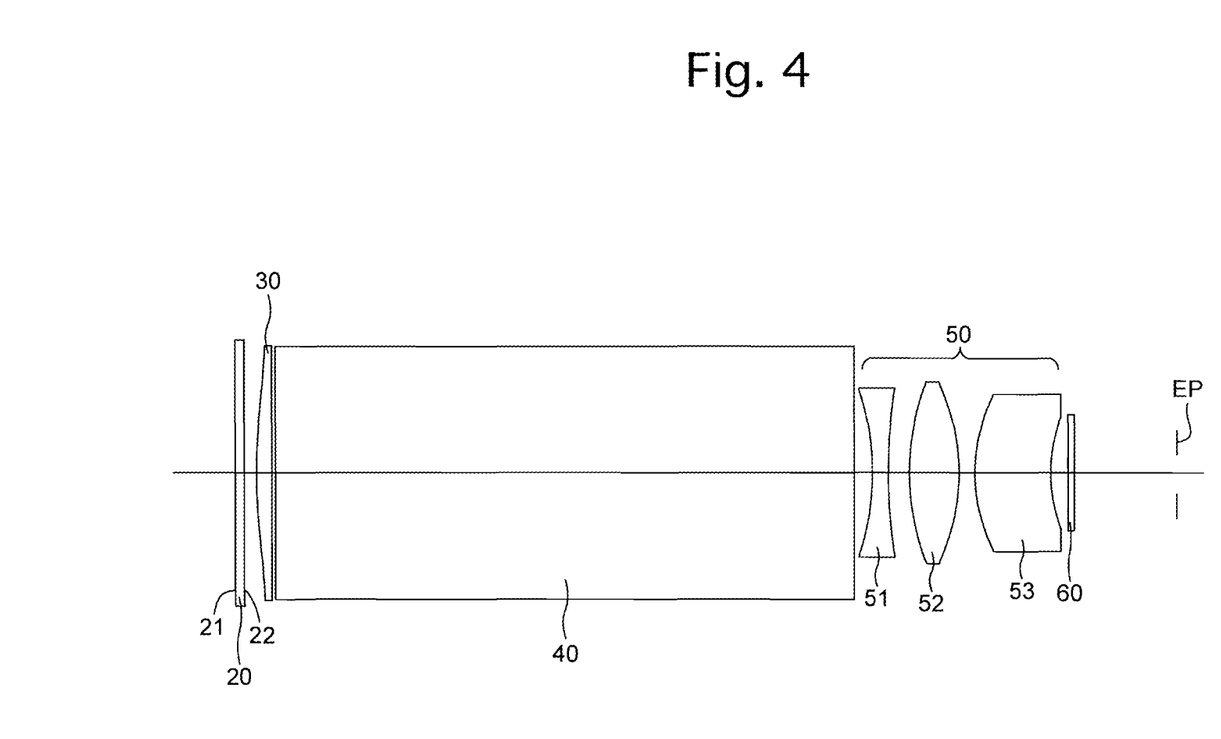
FIG. 4 shows a lens arrangement of a second numerical embodiment of an eyepiece optical system, according to the present invention, when the diopter with respect to the focal-plane plate (focusing plate) is adjusted to $-1$.
Figure 5A:
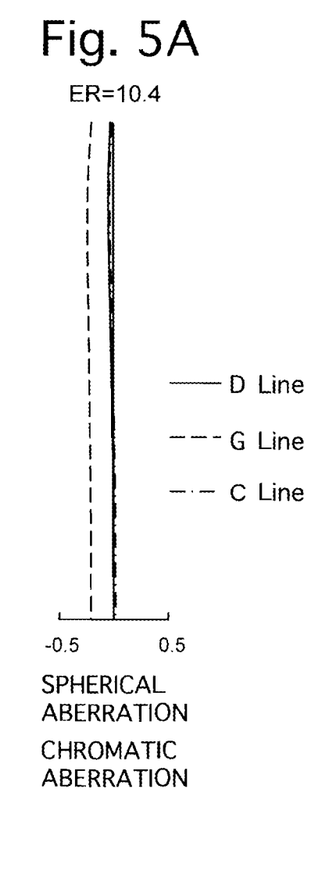
FIGS. 5A, 5B, 5C and 5D show various aberrations of the eyepiece optical system, having the lens arrangement of FIG. 4.
Figure 5B:
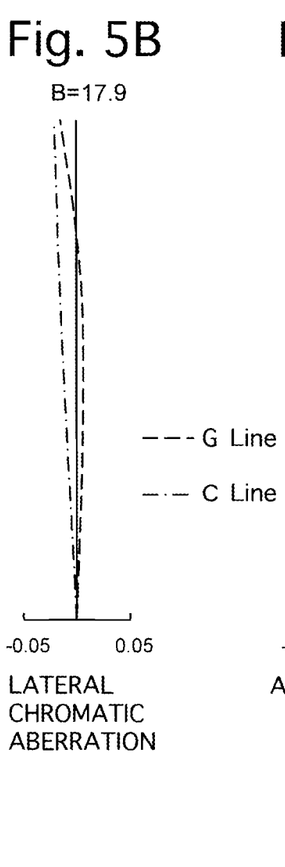
Figure 5C:
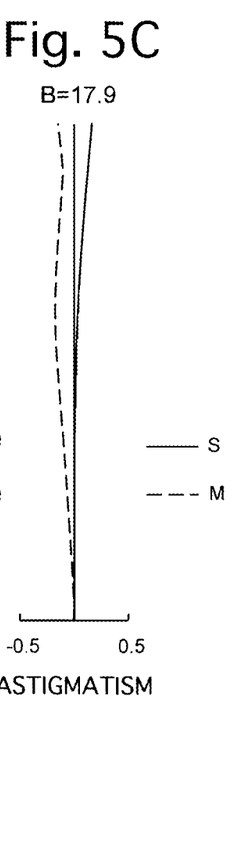
Figure 5D:
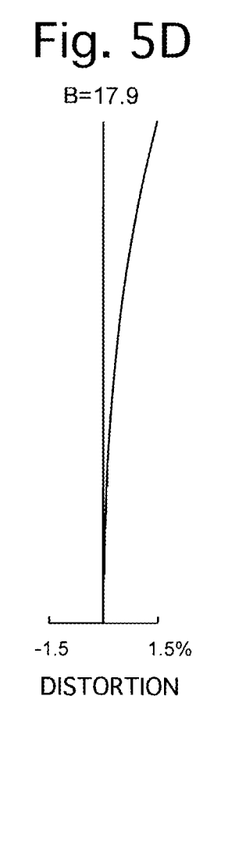

FIGS. 4 through 5D and Tables 4 through 6 show a second numerical embodiment of the eyepiece optical system, according to the present invention. FIG. 4 shows a lens arrangement of a eyepiece optical system when the diopter value is −1. FIGS. 5A, 5B, 5C and 5D show various aberrations of the eyepiece optical system when the diopter value is −1. Table 4 shows the lens surface data, Table 5 shows the aspherical surface data, and Table 6 shows various lens-system data.

The lens arrangement of the second numerical embodiment is the same as that of the first numerical embodiment except for the following feature:

(1) The condenser lens element 30 is configured of a planoconvex positive lens element having a convex surface on the object side, and an aspherical surface is formed on this convex surface on the object side. The aspherical surface on the object side of the condenser lens element 30 has a profile, when viewed macroscopically, such that the positive refractive power thereof increasingly weakens with respect to a direction away from the optical axis.

TABLE 1

LENS SURFACE DATA

| Surface No. | R | D | N(d) | νd |
|---|---|---|---|---|
| 1* | 24.250 (Fresnel Surface) | 1.500 | 1.49176 | 57.5 |
| 2 | Primary Imaging Plane | 1.54 | | |
| 3 | ∞ | 3.00 | 1.52538 | 56.3 |
| 4* | −85.500 | 0.600 | | |
| 5 | ∞ | 91.664 | 1.77250 | 49.6 |
| 6 | ∞ | 2.860 | | |
| 7* | −46.000 | 2.550 | 1.62133 | 25.0 |
| 8 | 89.420 | D8 | | |
| 9 | 41.300 | 7.800 | 1.52538 | 56.3 |
| 10* | −33.800 | D10 | | |
| 11* | 27.650 | 12.000 | 1.52538 | 56.3 |
| 12 | 25.690 | 2.750 | | |
| 13·X· | ∞ | 1.00 | 1.51633 | 64.1 |
| 14·X· | ∞ | 16.150 | | |
| 15 | Eyepoint | | | |

The asterisk (*) designates an aspherical surface which is rotationally symmetrical with respect to the optical axis.
The symbol (X) designates the cover glass 60.

TABLE 2

ASPHERICAL SURFACE DATA

| Surf. No. | K | A4 | A6 | A8 |
|---|---|---|---|---|
| 1 | −1.0000 | 1.52700E−06 | −4.04300E−09 | 0.00000E+00 |
| 4 | 0.0000 | 0.00000E+00 | 1.20000E−08 | 0.00000E+00 |
| 7 | 0.0000 | −4.17000E−06 | 9.52000E−09 | −2.20000E−11 |
| 10 | 0.0000 | 1.47000E−06 | 9.59000E−09 | 0.00000E+00 |
| 11 | 0.0000 | −5.42000E−06 | −7.38000E−09 | 1.00000E−11 |

TABLE 4

LENS SURFACE DATA

| Surface No. | R | D | N(d) | νd |
|---|---|---|---|---|
| 1* | 32.834 (Fresnel Surface) | 1.500 | 1.49176 | 57.5 |
| 2 | Primary Imaging Plane | 1.99 | | |
| 3* | 85.500 | 2.400 | 1.52538 | 56.3 |
| 4 | ∞ | 0.600 | | |
| 5 | ∞ | 91.664 | 1.77250 | 49.6 |
| 6 | ∞ | 2.860 | | |
| 7* | −46.000 | 2.550 | 1.62133 | 25.0 |
| 8 | 89.420 | D8 | | |
| 9 | 41.300 | 7.800 | 1.52538 | 56.3 |
| 10* | −33.800 | D10 | | |
| 11* | 27.650 | 12.000 | 1.52538 | 56.3 |
| 12 | 25.690 | 2.750 | | |
| 13·X· | ∞ | 1.00 | 1.51633 | 64.1 |
| 14·X· | ∞ | 16.150 | | |
| 15 | Eyepoint | | | |

The asterisk (*) designates an aspherical surface which is rotationally symmetrical with respect to the optical axis.
The symbol (X) designates the cover glass 60.

TABLE 5

ASPHERICAL SURFACE DATA

| Surf. No. | K | A4 | A6 | A8 |
|---|---|---|---|---|
| 1 | −1.0000 | 4.13400E+06 | 0.00000E−00 | 0.00000E+00 |
| 3 | 0.0000 | −6.55000E+06 | 0.00000E−00 | 0.00000E+00 |
| 7 | 0.0000 | −4.17000E−06 | 9.52000E−09 | −2.20000E−11 |
| 10 | 0.0000 | 1.47000E−06 | 9.59000E−09 | 0.00000E+00 |
| 11 | 0.0000 | −5.42000E−06 | −7.38000E−09 | 1.00000E−11 |

TABLE 6

VARIOUS LENS-SYSTEM DATA

| Diopter | −1 Diopter | −3.0 Diopter | +1.0 Diopter |
|---------|------------|--------------|--------------|
| f       | 67.4161    | 69.6820      | 65.3164      |
| D8      | 3.350      | 1.470        | 5.200        |
| D10     | 2.500      | 4.380        | 0.650        |

[Numerical Embodiment 3]

Figure 6:
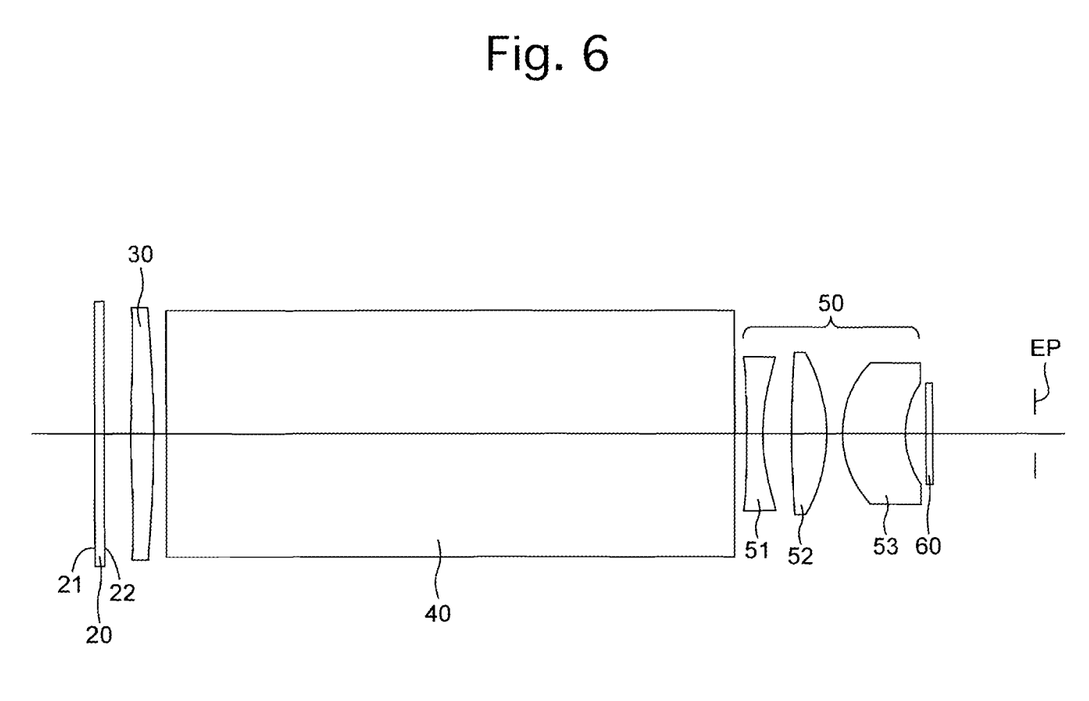
FIG. 6 shows a lens arrangement of a third numerical embodiment of a eyepiece optical system, according to the present invention, when the diopter with respect to the focal-plane plate (focusing plate) is adjusted to −1.
Figure 7A:
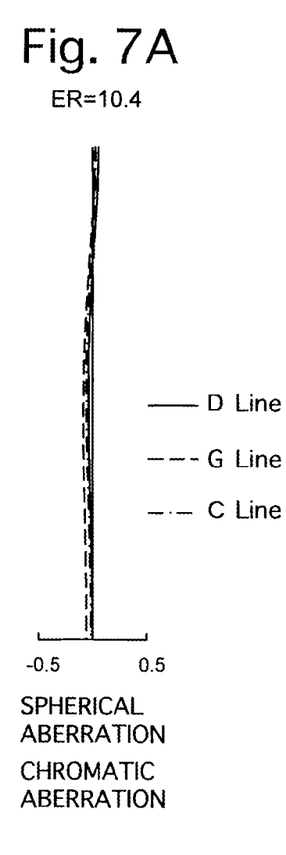
FIGS. 7A, 7B, 7C and 7D show various aberrations of the eyepiece optical system, having the lens arrangement of FIG. 6.
Figure 7B:
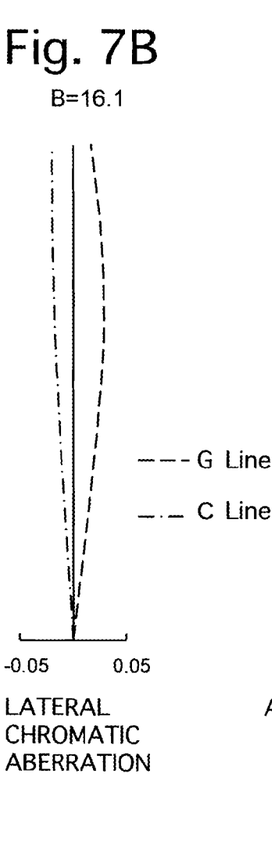
Figure 7C:
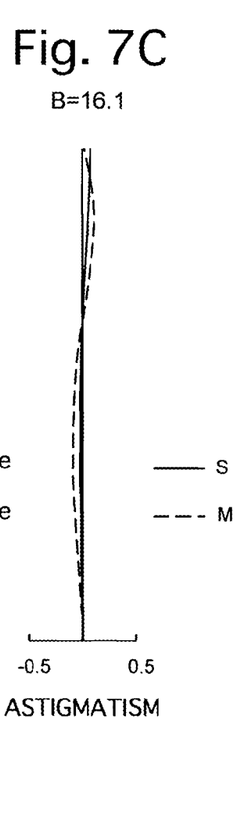
Figure 7D:
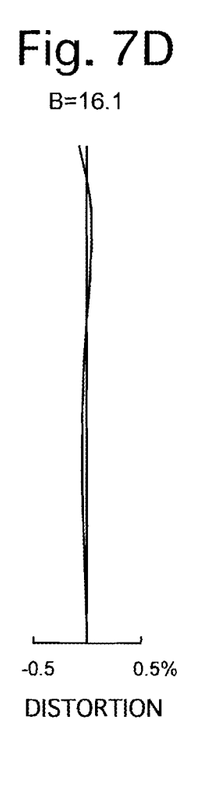

FIGS. 6 through 7D and Tables 7 through 9 show a third numerical embodiment of the eyepiece optical system, according to the present invention. FIG. 6 shows a lens arrangement of a eyepiece optical system when the diopter value is −1. FIGS. 7A, 7B, 7C and 7D show various aberrations of the eyepiece optical system when the diopter value is −1. Table 7 shows the lens surface data, Table 8 shows the aspherical surface data, and Table 9 shows various lens-system data.

The lens arrangement of the third numerical embodiment is the same as that of the first numerical embodiment except for the following features:

(1) The condenser lens element 30 is configured of a biconvex positive lens element, and an aspherical surface is formed on each convex surface on the object side and on the image side. The aspherical surface on the each of the object and image sides of the condenser lens element 30 has a profile, when viewed macroscopically, such that the positive refractive power thereof increasingly weakens with respect to a direction away from the optical axis.

(2) The eyepiece optical lens group 50 is configured of a biconcave negative first lens element 51, a biconvex positive second lens element 52, and a third lens element 53, in that order from the object side to the viewing side. The first lens element 51 is provided with an aspherical surface on each of the object side and the image side thereof. The second lens element 52 is provided with an aspherical surface on the object side thereof. The third lens element 53 is provided with an aspherical surface on the object side thereof.

TABLE 7

LENS SURFACE DATA

| Surface No. | R | D | N(d) | vd |
|---|---|---|---|---|
| 1* | 32.834 (Fresnel Surface) | 1.500 | 1.49176 | 57.5 |
| 2 | Primary Imaging Plane | 4.250 | | |
| 3* | 160.000 | 3.600 | 1.52538 | 56.3 |
| 4* | −200.000 | 2.000 | | |
| 5 | ∞ | 89.998 | 1.51633 | 64.1 |
| 6 | ∞ | 1.920 | | |
| 7* | −292.260 | 2.550 | 1.60641 | 27.0 |
| 8* | 32.700 | D8 | | |
| 9* | 81.360 | 5.600 | 1.52538 | 56.3 |
| 10 | −27.000 | D10 | | |
| 11* | 17.610 | 10.000 | 1.52538 | 56.3 |
| 12 | 15.000 | 3.300 | | |
| 13✕ | ∞ | 1.00 | 1.51633 | 64.1 |
| 14✕ | ∞ | 16.150 | | |
| 15 | Eyepoint | | | |

The asterisk (*) designates an aspherical surface which is rotationally symmetric with respect to the optical axis.
The symbol (✕) designates the cover glass 60.

TABLE 8

ASPHERICAL SURFACE DATA

| Surf. No. | K | A4 | A6 | A8 |
|---|---|---|---|---|
| 1  | −1.0000 | 4.80000E−06  | 0.00000E+00  | 0.00000E+00 |
| 3  |  0.0000 | −7.00000E−06 | 0.00000E+00  | 0.00000E+00 |
| 4  |  0.0000 | 0.00000E+00  | 1.50000E−09  | 0.00000E+00 |
| 7  |  0.0000 | 1.38900E−05  | −1.65400E−07 | 4.40000E−11 |
| 8  |  0.0000 | 0.00000E+00  | −1.06500E−07 | 0.00000E+00 |
| 9  |  0.0000 | −4.43500E−05 | 2.39700E−07  | −4.80000E−10 |
| 11 |  0.0000 | 2.38700E−05  | −9.10000E−08 | 1.00000E−11 |

TABLE 9

VARIOUS LENS-SYSTEM DATA

| Diopter | −1 Diopter | −3.0 Diopter | +1.0 Diopter |
|---------|------------|--------------|--------------|
| f       | 74.6142    | 77.5445      | 71.9358      |
| D8      | 4.550      | 2.650        | 6.420        |
| D10     | 2.500      | 4.400        | 0.730        |

The numerical values of each condition for each embodiment are shown in Table 10.

TABLE 10

| | Cond. (1) | Cond. (2) | Cond. (3) | Cond. (4) | Cond. (5) | Cond. (6) |
|---|---|---|---|---|---|---|
| Numerical Embod. 1 | −0.010 | 2.827 | 0.044 | 0.045 | 0.107 | 1.161 |
| Numerical Embod. 2 | −0.008 | 0.044 | 0.043 | 0.036 | 0.108 | 1.161 |
| Numerical Embod. 3 | −0.024 | −0.013 | −0.072 | 0.048 | 0.123 | 1.230 |

As can be understood from Table 10, the first through third numerical embodiments satisfy conditions (1) through (6). Furthermore, as can be understood from the aberration diagrams, the various aberrations are favorably corrected.

Although in the above illustrated embodiments the photographing lens 70 is an interchangeable type, the eyepiece optical system of the present invention can also be applied to a photographing lens that is not an interchangeable type.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An eyepiece optical system comprising:
a focal-plane plate, having a positive refractive power on one side of the focal-plane plate and a diffusion surface on another side of the focal-plane plate; a reflector which reflects light rays of an object image, formed on said diffusion surface, a predetermined number of times; an optical lens group, by which said object image is observed, in that order along an optical path from an object side to a viewing side of the eyepiece optical system; and a condenser lens element, having a positive refractive power, provided between said focal-plane plate and said reflector, said condenser lens element having an aspherical surface provided on at least one side of the condenser lens element, wherein said aspherical surface provided on the at least one side of said condenser lens element has a profile, when viewed macroscopically, such that the positive refractive power of the condenser lens element increasingly weakens with respect to a direction away from an optical axis of the condenser lens element, an aspherical surface is provided on said one side of said focal-plane plate, which has a positive refractive power, said diffusion surface is provided on an exit surface of said focal-plane plate, and the following condition is satisfied:

$$-0.5<\tan\theta_0/(\tan\theta_1-\tan\theta_2)<3.0,$$

wherein $\tan\theta_n$ (n=1, 2) designates an inclination of the aspherical departure obtained from a aspherical surface sag amount that is calculated at a height $h_1$ from the optical axis, $\tan\theta_0$=(aspherical surface sag amount at height $1.01h_1$–aspherical surface sag amount at height $0.99h_1$)/$0.02h_1$, when $h_1$ is measured from an optical axis at said positive refractive powered surface of said focal-plane plate, $\tan\theta_1$=(aspherical surface sag amount at height $1.01h_1$–aspherical surface sag amount at height $0.99h_1$)/$0.02h_1$, when $h_1$ is measured from the optical axis at an incident surface of said condenser lens element, $\tan\theta_2$=(aspherical surface sag amount at a height $1.01h_1$–aspherical surface sag amount at height $0.99h_1$)/$0.02h_1$, when $h_1$ is measured from the optical axis at an exit surface of said condenser lens element, aspherical surface sag amount at height $0.99h_1$=total sag amount at height $0.99h_1$–paraxial spherical-surface sag at height $0.99h_1$, aspherical surface sag amount at height $1.01h_1$=total sag amount at height $1.01h_1$–paraxial spherical-surface sag at height $1.01h_1$, and said sag amount is the amount of displacement between a tangent line and an optical surface.

2. The eyepiece optical system according to claim 1, wherein a diopter of said optical lens group is adjustable with respect to said focal-plane plate, through said eyepiece optical system, and the following condition is satisfied:

$$-0.030<d*(n-1)*\tan\theta_1/h_1+(t/n+d)*(1-n)*\tan\theta_2/h_1<-0.005,$$

wherein $h_1$, which is calculated as $h_1=f*\tan(14°)$, designates a height from the optical axis at the focal-plane plate, wherein f designates the a focal length of the eyepiece optical system, in a state where the diopter with respect to the focal-plane plate, through said eyepiece optical system, is adjusted to −1, d designates an air-equivalent distance from the diffusion surface of said focal-plane plate to the incident surface of said condenser lens element, t designates a thickness of said condenser lens element at the optical axis, and n designates a refractive index at a d-line of said condenser lens element.

3. The eyepiece optical system according to claim 1, wherein a diopter of said optical lens group is adjustable with respect to said focal-plane plate, through said eyepiece optical system, and wherein the following condition is satisfied:

$$-0.1<\tan\phi_1-\tan\phi_2,$$

wherein $\tan\phi_1$ designates an inclination, relative to the optical axis, of a tangent line at a height $h_2$ from said optical axis on the incident surface of the condenser lens element, on a predetermined sectional plane through said optical axis, $\tan\phi_2$ designates an inclination, relative to the optical axis, of a tangent line at a height $h_2$ from the optical axis on the exit surface of the condenser lens element, on said predetermined sectional plane, and $h_2$, which is calculated as $h_2=f*\tan(16°)$, designates a height from the optical axis, wherein f designates a combined focal length of said eyepiece optical system, in a state where the diopter with respect to the focal-plane plate, through said eyepiece optical system, is adjusted to −1.

4. The eyepiece optical system according to claim 1, wherein a diopter of said optical lens group is adjustable with respect to said focal-plane plate, through said eyepiece optical system, and wherein the following condition is satisfied:

$$0.01<t/f<0.2,$$

wherein f designates a combined focal length of said eyepiece optical system, in a state where the diopter with respect to said focal-plane plate, through said eyepiece optical system, is adjusted to −1, and t designates a thickness of said condenser lens element at the optical axis.

5. The eyepiece optical system according to claim 1, wherein said eyepiece optical lens group comprises a negative first lens element, a positive biconvex second lens element, and a third lens element having a concave surface on the viewing side, in that order along the optical path from the object side toward the viewing side, wherein said second lens element is configured to move in a direction along an optical axis of said eyepiece optical lens group to change a diopter adjustment, with respect to said focal-plane plate, and wherein the following conditions are satisfied:

$$-0.2<f/f3<0.2,$$

and $$1.15<[L3b/(L3n-1)+L3d/L3-n]/\{L3b/(L3n-1)\}<1.30,$$

wherein f designates a combined focal length of said eyepiece optical system, in a state where the diopter with respect to said focal-plane plate, through said eyepiece optical system, is adjusted to of −1, f3 designates a focal length of said third lens element, L3 n designates a refractive index of said third lens element at a d-line of said third lens element, L3 b designates a radius of curvature of the concave surface on the viewing side of said third lens element, and L3 d designates a lens thickness of said third lens element.

6. The eyepiece optical system according to claim 1, wherein an effective diagonal length of said one side, which has a positive refractive power, of said focal-plane plate is set at a half-size of at least 10 mm.

* * * * *